Aug. 18, 1936.  R. R. HUNT  2,051,258
PNEUMATIC GAUGE
Filed Nov. 1, 1929  3 Sheets-Sheet 1
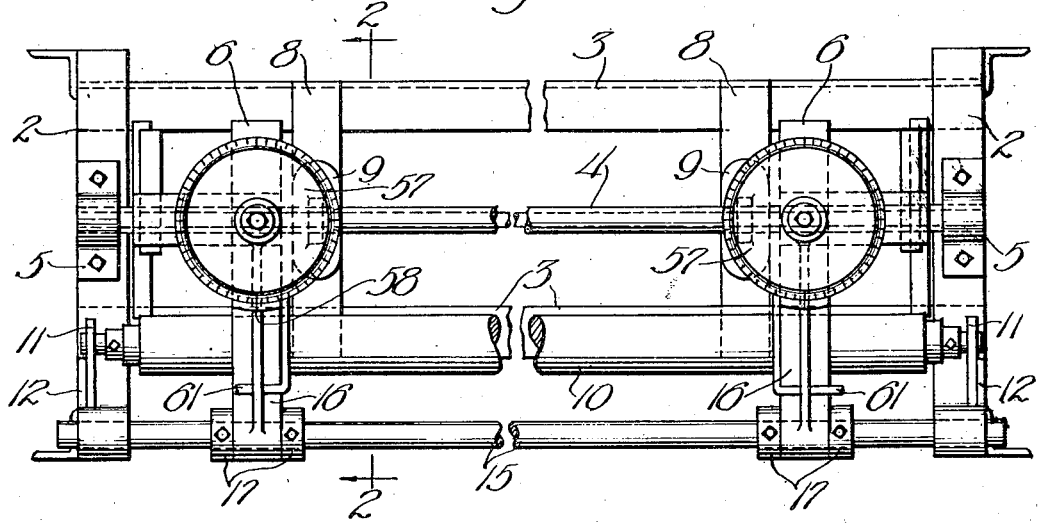
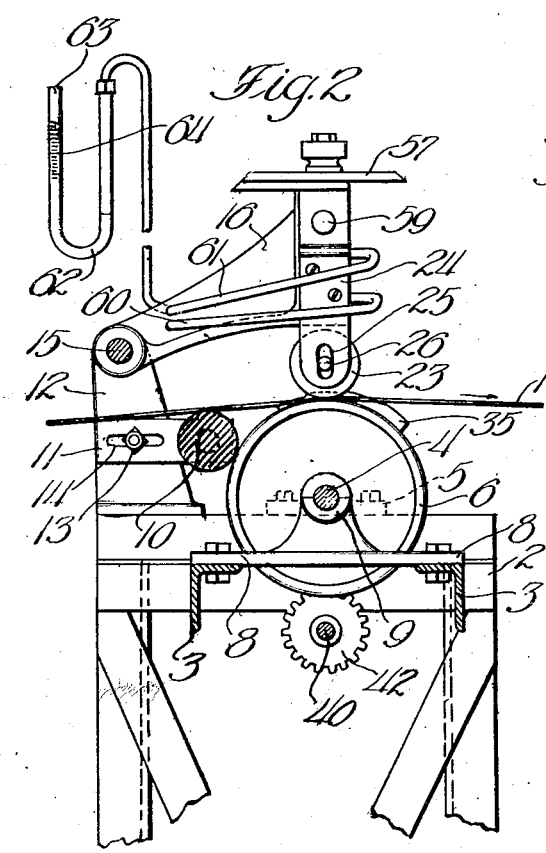
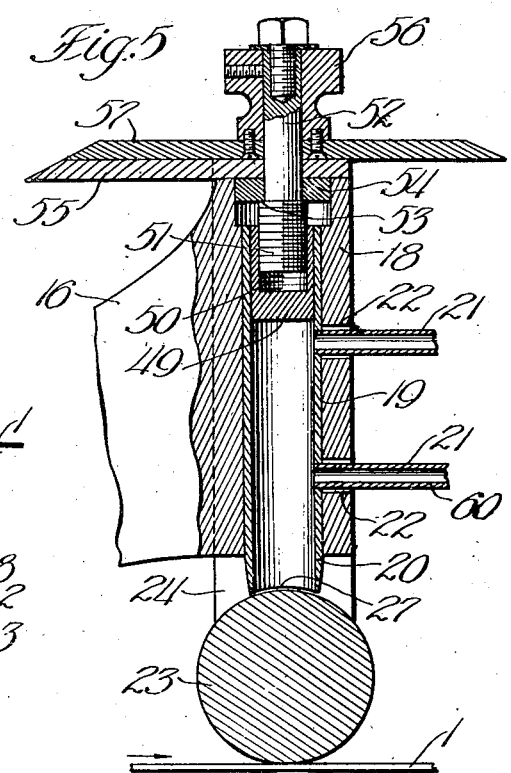

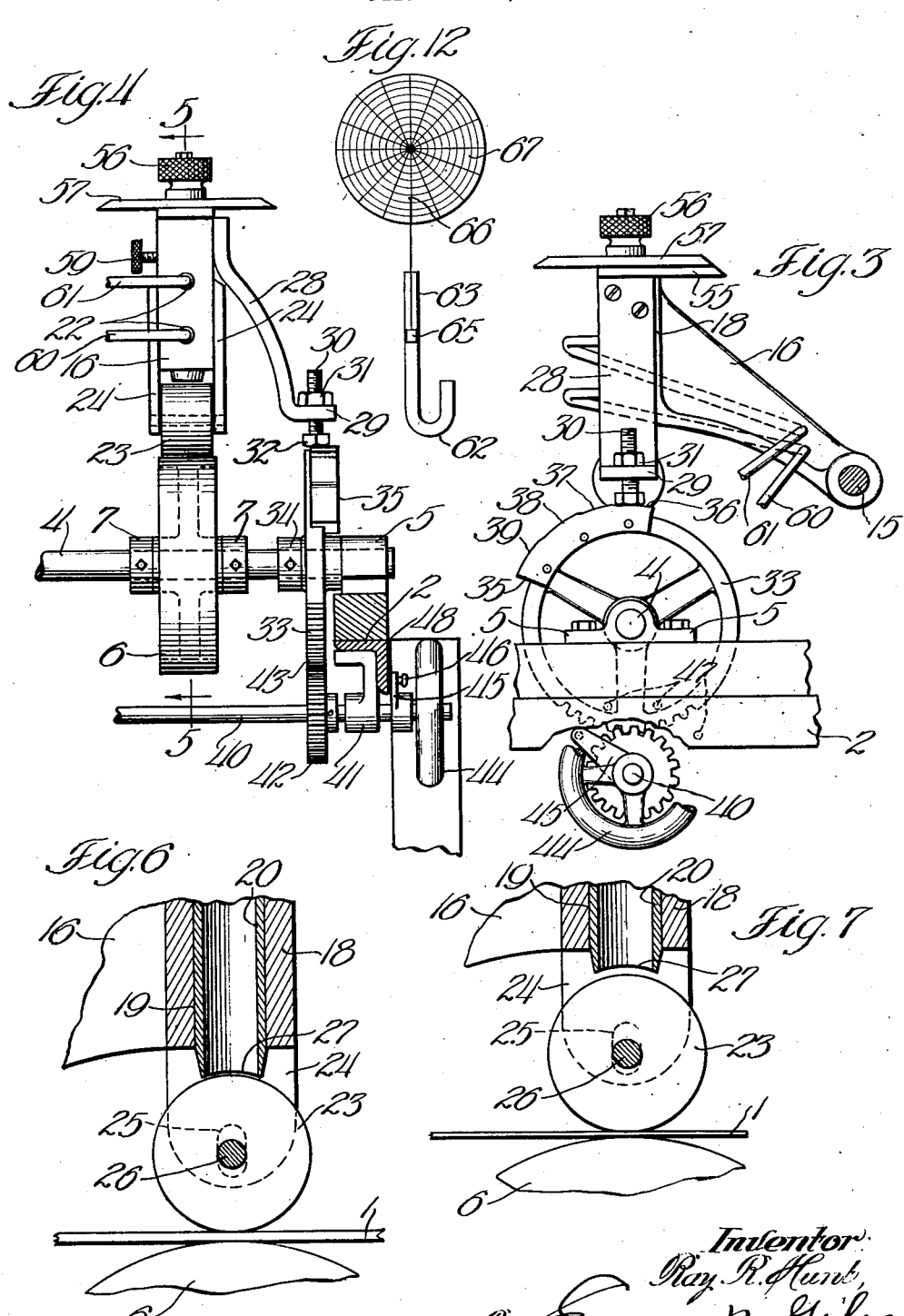

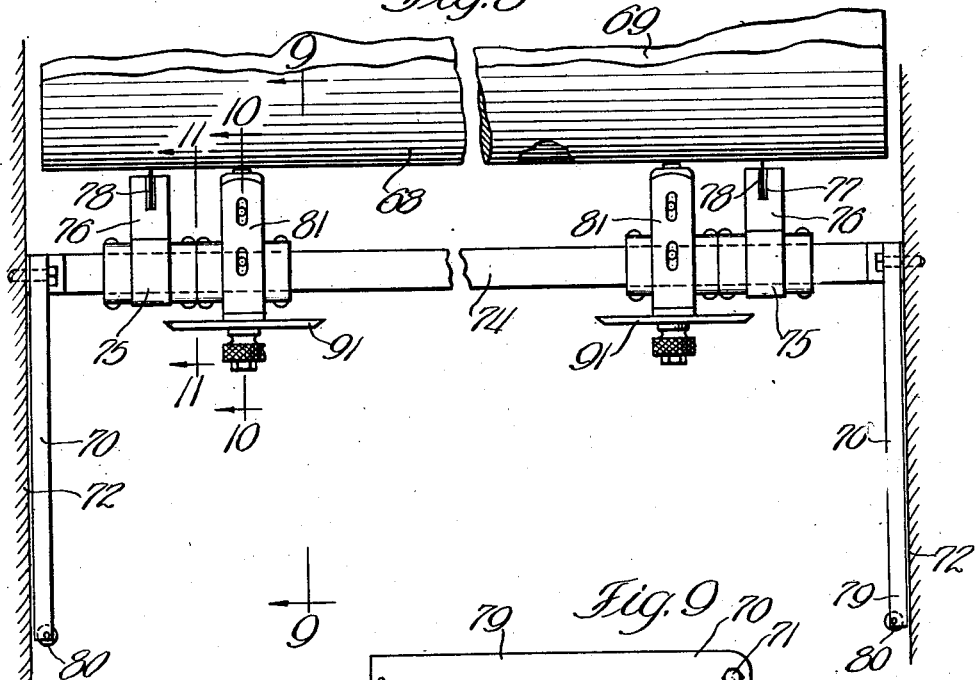
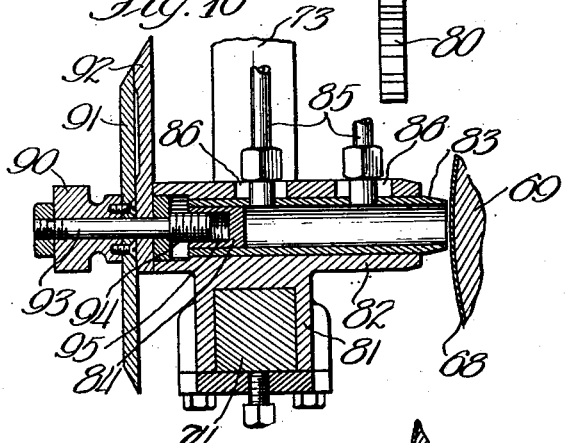
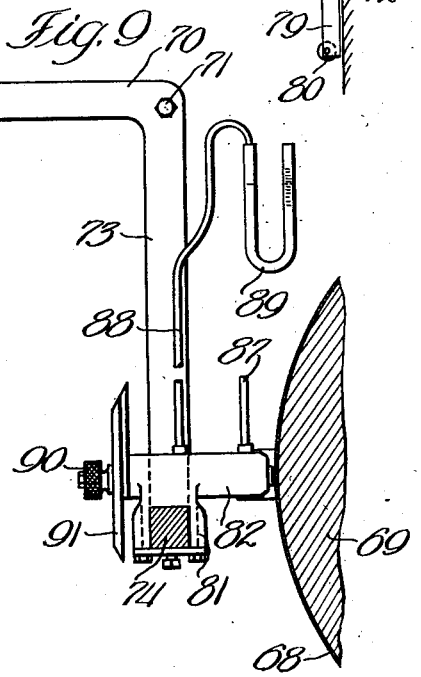
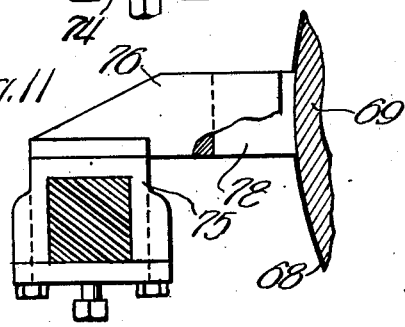

Patented Aug. 18, 1936

2,051,258

UNITED STATES PATENT OFFICE 2,051,258

PNEUMATIC GAUGE

Ray R. Hunt, Mishawaka, Ind., assignor to Mishawaka Rubber and Woolen Manufacturing Company, Mishawaka, Ind., a corporation of Indiana Application November 1, 1929, Serial No. 404,067

7 Claims. (Cl. 33—172)

My invention relates to a gauging or measuring method and apparatus wherein the measurement to be tested or ascertained acts through regulation of fluid in a pressure system to show, in a pronounced manner or on a large scale, slight variations of measurement, this invention being particularly adaptable to pneumatically gauge or measure and keep a constant check on the thickness of a sheet or layer of material.

In the production of certain materials in sheets or layers it is highly desirable to test or measure and regulate the thickness thereof accurately and maintain a continual check thereon so as to insure uniform and proper gauge or thickness throughout the sheet or layer. This is particularly important in the rubber industry as extra thickness entails a considerable loss, whereas insufficient thickness oftentimes impairs the quality of the goods made from or with the sheet or layer of rubber.

The principal objects of my invention are to provide an improved measuring or gauging method and apparatus; to provide a device which is highly sensitive and accurately responsive to slight variations of measurement; to indicate such variations with a high degree of magnification or on a sufficiently enlarged scale so that they are readily apparent; to accomplish the magnification or enlargement of indication through a medium which acts freely and practically without any frictional or other resistance; to utilize a medium which affords a dampening effect to minimize abrupt or violent movements of the indicator; to dispense with wearing parts and thus insure continued accuracy; to accomplish the measurement indication by the flow or pressure of fluid which is affected by variations in the measurement that is being tested or ascertained; to measure or test the thickness of a sheet of material while in motion; to provide a reliable method and means whereby the thickness of a coating on another layer of material may be accurately and conveniently determined; to provide a gauge which may be set for desired thicknesses; to avoid inaccuracies due to changes of temperature, magnetism and other disturbing factors; to permit location of the indicator, if desired, remote from the place where the test or measurement is being taken; and in general to provide a simple and reliable apparatus which may be built and operated at a comparatively low cost and conveniently employed to measure or gauge the thickness of sheets of material accurately and which indicates slight variations of thickness in a pronounced manner.

On the drawings:

Fig. 1 is a top view of a gauge constructed in accordance with my invention for measuring the thickness of a moving sheet of material such as rubber;

Fig. 2 is a sectional view on the line 2—2 of Fig. 1 showing one of the gauge units;

Fig. 3 is an enlarged fragmentary view of the gauge unit of Fig. 2 taken from the opposite or outer side;

Fig. 4 is a front view of the gauge unit;

Fig. 5 is an enlarged vertical sectional view on the line 5—5 of Fig. 4;

Figs. 6 and 7 are detail views illustrating the measuring adjustment which controls the operation of the indicator;

Fig. 8 is a top view of a modified form of the invention for use in gauging the rubber coating on a roll;

Fig. 9 is a sectional view on the line 9—9 of Fig. 8;

Fig. 10 is an enlarged sectional view on the line 10—10 of Fig. 8;

Fig. 11 is an enlarged sectional view on the line 11—11 of Fig. 8; and

Fig. 12 is a view, somewhat diagrammatic, showing the application of a recording device to my gauge.

Referring to the drawings, and particularly to Figs. 1 to 7 inclusive, in which I have shown an apparatus constructed in accordance with my invention for gauging the thickness of a sheet of rubber as it comes from the rolls of a calendering machine, the reference numeral 1 indicates the sheet of rubber composition which is withdrawn from the calendering machine by suitable tape up or winding mechanism. The gauging mechanism is located between the calendering machine and the take up or winding mechanism, and the sheet 1 of rubber composition is fed by the tack up or winding mechanism through the gauging apparatus in the direction indicated by the arrow. Neither the calendering machine nor take up mechanism is shown as they are old and well known structures.

A frame of any suitable construction supports the gauging apparatus, and in the illustrated structure comprises end standards 2 suitably connected by cross members 3 which extend transversely under the sheet 1 of rubber and beyond the lateral edges thereof. A shaft 4, which is secured at its ends in brackets 5 on the standards 2, extends under the sheet 1 of rubber and carries a pair of flat faced idler wheels or rollers 6 over which the sheet 1 of rubber passes, these wheels or rollers 6 being loosely mounted to rotate freely on the shaft 4 between collars 7, which may be adjusted to locate the rollers 6 as desired. Preferably a wheel or roller 6 is arranged adjacent and a short distance inwardly from each lateral edge of the sheet 1. Additional support for the shaft 4 is also afforded by plates 8 which are mounted respectively at the inner side of each wheel or roller 6 on the cross members 3 of the frame, each plate 8 having a half bearing 9 thereon engaging the under half of the shaft 4 as shown in Fig. 2.

For guiding the sheet 1 onto the rollers 6 and to prevent undesirable sagging thereof between the rollers 6, an idler roll 10 extends between the standards 2 and is journaled at its ends in bearing plates 11 on brackets 12, which latter extend upwardly from the respective standard 2. The bearing plates 11 are secured to the brackets 12 by bolts 13 which engage through slots 14 of the bearing plates and permit adjustment of the latter for properly locating the roll 10 close to the wheels or rollers 6 and below the upper extremities thereof, as shown in Fig. 2.

The brackets 12 extend upwardly beyond the location of the bearing plates 11 and support the shaft 15 in an elevated position above the path of movement of the sheet 1 and this shaft has a pair of gauge supporting arms 16 pivoted thereon between collars 17 which are adjustable on the shaft 15 to permit location of the outer or free end of each supporting arm 16 over a wheel or roller 6. Each arm 16 is formed at its outer end with a housing 18 having a substantially vertical opening 19 therethrough in which a tubular gauge member 20 is mounted to slide axially and held against turning movement by a pair of tubular branches 21 which are secured on and communicate with the interior of the tube 20 and engage through openings 22 in the wall of the housing 18, said openings 22 being elongated vertically in the form of short slots to permit a limited amount of axial adjustment of the tube 20 in the housing 18. Each housing 18 has a roller 23 mounted thereon at the lower end to move freely to and from the lower end of the tube 20, a pair of plates 24 being secured respectively to the opposite sides of each housing so as to extend therebelow, and the lower projecting ends of each pair of plates 24 being correspondingly slotted as at 25 to receive the trunnions or journals 26 of the roller 23. The roller 23 is thus not only free to rotate but also freely movable up and down in the slots 25 to and from the end of the tube 20, being guided in the latter movement by the plates 24 and the slots 25 thereof, and in its up and down movement said roller regulates or varies the outlet from the lower end of the tube 20, which preferably has the lower end formed as at 27 to conform to the peripheral face of the roller 23.

The sheet 1 of rubber or other material to be gauged or measured passes over the supporting and guiding roll 10 and then between the wheels or rollers 6 and the gauge rollers 23 and as the latter rollers ride on and are supported by the moving sheet 1, any variation in the thickness thereof will cause a corresponding elevation or depression of the roller 23 and this in turn will cause a corresponding regulation of the gap between the roller 23 and the lower end of the tube 20 which is held in a predetermined fixed position above the wheel or roller 6.

For supporting the outer ends of the arms 16 so as to hold the tube 20 in the above mentioned predetermined position above the wheel or roller 6, each housing 18 has an arm 28 secured to the outer side thereof and extending downwardly and outwardly therefrom as shown in Fig. 4 and provided at the lower end with an outturned portion 29 having a threaded aperture in which an adjusting screw 30 engages and is locked by the lock nut 31, said adjusting screw preferably having the head 32 at the lower end as shown. A segment gear 33 is loosely mounted on the shaft 4 under the lower end of each arm 28, it being understood that there is a segment gear 33 adjacent the inner side of each end standard 2 of the supporting frame of the apparatus, each of which is confined on the shaft 4 between a collar 34 and the adjoining bracket 5, and these segment gears have corresponding stepped plates 35 at the top thereof with successive stepped cam faces 36, 37, 38, and 39 which may be optionally positioned under the head of the respective adjusting screw 30, for supporting the respective arm 16 and its gauge mechanism.

These cam faces 36, 37, 38, and 39 are arranged at successive slightly higher elevations for readily changing the gauge mechanism to accommodate different thicknesses of sheets 1 which it may be desired to make, and are adjustable by turning movement of the segment gears 33 which are connected for simultaneous and corresponding movement. To this end a shaft 40 extends from end to end of the supporting frame of the apparatus and is journaled at the opposite ends in bearings 41 on the standards 2 and this shaft has a pinion 42 fixed thereon adjacent each segment gear 33 and meshing with the teeth 43 thereof. This shaft 40 projects beyond the bearing 41 at one end and is provided with a hand wheel 44 for turning the shaft, and as the stepped plates 33 are correspondingly arranged on the segment gears 33, the turning of the hand wheel 44 and shaft 40 will bring corresponding cam faces 36, 37, 38, or 39 under the adjusting and supporting screws 30 of both gauging devices so that simultaneous and corresponding adjustment thereof occurs.

For locking this cam adjusting mechanism in any selected position of adjustment, the shaft 40 has an arm 45 fixed thereon between the hand wheel 44 and the adjacent standard 2, and provided with a locking pin 46 at the outer end which may be optionally engaged with any of the four openings, (indicated by dotted lines at 47 in Fig. 3) in a plate 48 (see Fig. 4) which said openings 47 are spaced and arranged to correspond to the four positions of adjustment of the cam plate 35.

For adjusting the gauge tube 20 axially in the housing, the upper end of said tube is closed by a plug 49 which has a threaded opening 50 in the upper end in which the enlarged threaded lower end 51 of the operating stem 52 engages, a shoulder 53 being formed at the upper end of the threaded portion 51 of the stem to engage a fixed collar 54 at the upper end of the housing 18. An index plate 55 is secured to the upper end of the housing 18 over the collar 54 and the stem 52 which projects upwardly through the collar 54 and index plate 55 has a knob 56 and dial 57 thereon, the former of which is adapted to turn the stem 52 and adjust the elevation of the gauge tube by the threaded connection 50—51 and the latter of which has graduations around the edge co-operating with an index mark 58 on the index plate 55 for convenience in adjusting. The knob 56 and dial 57 are fixed on the stem so as to keep the shoulder 53 of the stem 52 in close engagement with the collar 54 and hold the stem 52 against axial movement so as to permit accurate adjustments of the gauge tube 20 by turning the knob 56, and the tube 20 may be locked in the various positions of such adjustment by the thumb screw 59 which is threaded through the wall of the housing 18 at a point to engage the plugged upper end of the tube 20.

In the operation of this gauge air under pressure is maintained in the gauge tube 20 which said pressure varies with the adjustment of the roller 23 due to variations in thickness of the sheet 1, and the variations in thickness of the sheet 1 are indicated, or recorded if desired, by a device which is responsive to variations in pressure in the gauge tube 20.

The air under pressure is supplied to the tube 20 from any suitable source through a tube 60 which connects with the lower branch 21 of the gauge 20, and the pressure in the tube 20 is communicated to the pressure responsive indicating or recording device through the tube 61 which connects with the upper branch 21 of the gauge tube 20, said tubes 60 and 61 being preferably of a flexible character on account of the movement thereof required in adjusting and moving the gauge mechanism, and they may be supported as indicated in Fig. 2 by passing through apertures in the swinging arm 16 adjacent the pivoted end thereof.

The air under pressure supplied through the tube 60 for operating this gauge may be obtained in any convenient manner, one method which applicant has found to satisfactorily accomplish the purpose being to provide a supply of air under a pressure greater than that required in the gauge and step it down through one or more ordinary reducing valves. In practice the reducing valve or valves have been set to supply a maximum pressure of about 15 pounds to the gauge tube and act automatically upon a lowering of the pressure in the gauge tube to supply air thereto.

The instrument for indicating the variations in thickness of the sheet 1 may be of any suitable type which is responsive to variations of pressure in the gauge tube 20, a simple and convenient form being a U-tube 62 of a well known type which has the tube 61 connected thereto at one end in the usual manner so as to cause the mercury therein to rise in the arm 63 proportionately to the pressure in the gauge tube 20. The arm 63 is provided with graduations for determining and comparing the elevations of the mercury column, these graduations being preferably spaced to indicate standard units of micrometric measurement usually employed in measuring the thickness of the sheet 1, and these graduations also preferably being arranged in opposite series from a zero mark 64 at which the mercury remains when the exact thickness desired is between the rollers 6 and 23. Thus any increase over the required thickness of the sheet will be indicated by a rise of the mercury above the zero mark 64 and any decrease by a lowering of the mercury below the mark 64 and the amount of such increase or decrease will be indicated in units of micrometric measurement usually employed in measuring thickness of sheet material.

A recording instrument may also be employed to record any variations so that the operator may keep check on the thickness without constant attendance. Any suitable recording instrument may be employed, one form being shown somewhat diagrammatically in Fig. 12 wherein the arm 63 of the mercury tube 62 is provided with a float 65 which rises and falls with the mercury in the arm 63 and is connected with a stylus or marker 66 operating over a rotating disk 67 upon which the thickness and variations of thickness are recorded. The disk 67 may be rotated by any usual mechanism or may be connected for operation by the movement of the sheet 1 or by the mechanism which causes such movement so that a certain movement of the dial 67 corresponds to a certain number of feet of length of the sheet 1.

In the operation of this gauging device, the machine is first set for the desired thickness by means of test plates of tempered steel or other material of the exact thickness of the sheet 1 that is required. One of these test plates is positioned between each pair of rollers 6 and 23 and with the proper cam face 36, 37, 38, or 39 under the adjusting screw 30 and the air supply system in operation, the adjusting screws 30 are turned until the mercury in the indicator 62 comes to rest and remains at the zero mark indicated on the drawings at 64. Finer adjustment may be obtained by turning the knob 56 if necessary.

It is to be understood that each of the gauge mechanisms has a separate indicator and air supply or reducing valve so that neither is affected by the other and each mechanism is set separately.

When the gauge mechanism is properly set for the desired thickness as indicated in Fig. 5, a gap remains between the roller 23 and the lower end of the tube 20 permitting uniform escapement or flow of air from the tube 20 whereas increase in thickness as indicated in Fig. 6 raises the roller 23 and decreases the opening from the lower end of the tube 20 while decrease in thickness as shown in Fig. 7 lowers the roller 23 and increases the opening from the tube; and it is the uniformity or variation of this gap and the resulting uniformity or variation of air leakage or flow through the gap which affects the pressure in the tube 20 and is communicated to the indicator 62. Obviously with this leakage the pressure maintained in the tube 20 is less than the maximum pressure of say 15 pounds, which the system would maintain if the lower end of the tube 20 were entirely closed and as the gap between the roller 23 and the tube 20 is decreased the maintained pressure rises and may approximate the maximum whereas as the gap between the roller 23 and the tube 20 increases a lowering of pressure occurs.

After the gauging mechanism has been properly set, the test plates are removed from between the rollers 6 and 23 and the sheet 1 of material started through the machine. The gauge will then indicate any variation from the desired thickness by rise or fall of the mercury with respect to the zero mark 64 and by adjusting the calender rolls or other mechanism which forms the sheet 1 and observing the effect on the indicator 62, the exact thickness may be obtained. Any variation in thickness as the sheet 1 is being produced, will be indicated on the gauge 62 or the recording instrument of Fig. 12 and may be corrected by adjusting the roller of the machine making the sheet 1.

In the event that it is desired to turn out sheets 1 of certain different thicknesses, the steps 36, 37, 38, and 39 are arranged for these particular thicknesses and the machine may be readily set for these different thicknesses by releasing the pin 46 and operating the hand wheel 44 to position the proper cam face of the plate 35 under the head of the screw 30. Slight variations in thickness may be provided for by adjustment of the knob 56 and the dial 57 may be graduated to indicate standard micrometric units of measurement of thickness so that by turning the knob 56 and dial the graduations on the dial showing the extent of movement thereof will indicate a definite known change in the thickness of sheet 1 for which the gauge is set.

Referring to Figs. 8 to 10 inclusive, I have shown my invention arranged to gauge or measure the thickness of a layer or coating of rubber which is to be applied on a sheet of fabric, it being customary in such cases to form the layer or film 68 of rubber composition separately on a roll 69 which carries it around and transfers it to and impresses it on the fabric.

For measuring or gauging the thickness of this layer or coating 68 of rubber composition, substantially the same structure as previously described is employed except that the gauge members require a somewhat different mounting with special means for holding the gauge tubes at a fixed distance from the roll, and the rubber layer or film 68 serves directly, without an interposed roller, to control the opening at the end of the gauge tube.

For mounting the gauge tubes a bell crank 70 is pivoted at the angle as indicated at 71 on each side portion 72 of the main frame of the machine, which said frame supports the roll 69, and the lower ends of the arms 73 of these bell cranks are connected by a square bar 74 which is located in front of the roll 69. A bracket 75 is clamped on the bar 74 near each end of the roll 69, said brackets being adjustable along the bar 74, and each bracket has an arm 76 projecting toward the roll 69 and provided at the outer end with a slit 77 within which a blade or thin piece 78 of steel is secured in an upright manner so that the forward edge thereof bears against the periphery of the roll, the arms 79 of the bell cranks 70 being provided at the outer ends with weights 80 which serve to hold these blades 78 in constant engagement with the periphery of the roll 69.

Another pair of brackets 81 are also clamped on and adjustable along the bar 74, one being located adjacent each bracket 75 and each bracket 81 has a tubular housing 82 at the top in which a gauge tube 83 is mounted, said gauge tube, like the gauge tube 20 of the previous gauge structure, being closed at the outer end by a plug 84 and provided with lateral tubular branches 85 extending through slots 86 of the housing 82, one of which said branches 85 is connected by a flexible tube 87 with a source of air under pressure and the other of which is connected by the flexible tube 88 with a mercury tube indicator 89 like that of the previous gauge structure or with a recording indicator, one type of which is illustrated in Fig. 12.

The open end of the gauge tube 83 is immediately adjacent the periphery of the roll 69 so that the layer or coating 68 thereon moves across the open end of the gauge tube with a leakage gap therebetween as shown in Fig. 10 which varies with the thickness of the layer or coating 68 and causes a variation in leakage which in turn causes a variation of pressure in the gauge tube 83 which is indicated by the pressure responsive device 89.

For adjusting the gauge tubes 83 to and from the roll 69, each has a knob 90 and dial 91, the latter operating over an index plate 92 on the outer end of the housing 82; and a stem 93 on which the knob 90 and dial 91 are secured projects into the outer end of the housing 82 and has an enlarged threaded inner end 94 engaging the threaded opening 95 of the plug 84, all in the same manner as the corresponding dial and knob adjusting structure of Figs. 1 to 7 inclusive.

The blade or thin steel bearings 78 are employed to maintain the bar 74 and gauge tube housings 82 at a fixed distance from the roll 69, inasmuch as the coating 68 of rubber on the roll 69 may extend out to or beyond the bearings 78, and by using the thin blade bearings they cut through the layer of rubber and maintain constant contact with the periphery of the roll 69 so that the accuracy of the gauge mechanism is unaffected.

The operation of this gauge of Figs. 8 to 11 inclusive is practically the same as that of Figs. 1 to 7 inclusive, the gauge tubes 82 being set at the proper distance from the roll 69 for the desired thickness of the rubber layer or coating 68 which setting positions the mercury in the indicator 89 at the zero point. As the layer or coating 68 is thereafter formed on and carried by the roll 69 across the open ends of the tubes 83 it controls the escape of air therefrom, which will be uniform and maintain a constant pressure in the tubes 83 so long as the proper thickness of the layer 68 is maintained. Any variation, however, in the thickness of the layer 68 will cause a variation of leakage from the tubes 83 with a consequent variation of pressure therein and an indication thereof on the pressure responsive device 89 will show the inaccuracy of thickness of the layer 68 which is to be corrected.

While I have shown and described my invention in a preferred form, I am aware that various changes and modifications may be made without departing from the principles of my invention, the scope of which is to be determined by the appended claims.

I claim as my invention:

1. In a device of the class described the combination of a roller over which sheet material is passed, a fluid pressure system having an outlet at a predetermined distance from the roller, said roller and outlet being adapted to have the sheet material passed therebetween, and a pressure responsive means connected with the fluid pressure system to indicate the thickness of the sheet material on the roller.

2. In an apparatus of the class described the combination of a fluid pressure system having an outlet, a roller adjacent to said outlet and over which sheet material is passed, said roller and outlet being adapted to have the sheet material passed therebetween, means for relatively adjusting the roller and outlet, and pressure responsive means connected with the fluid pressure system for gauging the thickness of the sheet material on the roller.

3. In a device of the class described the combination of a fluid pressure system having an outlet, a member free to move toward and away from said outlet and adapted in such movement to regulate the discharge from said outlet, means for supporting moving sheet material in position to regulate the adjustment of said member according to the thickness of said sheet material, and indicating means which is responsive to variations of pressure in the fluid pressure system.

4. In a device of the class described the combination of a drum, a fluid pressure system having an outlet discharging toward the periphery of the drum, means engaging the periphery of the drum for holding said outlet at a fixed distance from the periphery of the drum and indicating means responsive to variations of pressure in the fluid pressure system.

5. In a device of the class described the combination of means for propelling sheet material and including a surface movable with and upon which the sheet material is supported in its movement, a fluid pressure system having an outlet at a fixed distance from and discharging toward said surface and said outlet being spaced from the said surface to permit free passage of the sheet material thereby, and pressure responsive means suitably connected with the fluid pressure system to gauge the thickness of the sheet material as it passes the said outlet.

6. In an apparatus of the class described, the combination of a fluid pressure system having an outlet, a rotatable roll on which sheet material is advanced past the outlet, said outlet being positioned to discharge toward the exposed face of the sheet material on the roll, a shoe riding on the face of the roll for holding the outlet at a fixed distance therefrom, and pressure responsive means connected with the fluid pressure system for gauging the thickness of the sheet material on the roll.

7. In a device of the class described the combination of a roller over which sheet material is passed, a fluid pressure system including a chambered member which has an outlet at a predetermined distance from the roller, said roller and outlet being adapted to have the sheet material passed therebetween, and pressure responsive means connected with the fluid pressure system to indicate the thickness of the sheet material on the roller, said chambered member being mounted on a swinging support for movement bodily from the operating position and said support having means thereon for graduated adjustment of the distance of the outlet from the roller.

RAY R. HUNT.